United States Patent Office 3,385,342
Patented May 28, 1968

3,385,342
PNEUMATIC TIRE MADE FROM HIGHLY
EXTENDED, TOUGH EPDM RUBBER
Charles F. Eckert, Wayne, N.J., assignor to Uniroyal,
Inc., a corporation of New Jersey
No Drawing. Filed July 6, 1965, Ser. No. 469,921
3 Claims. (Cl. 152—330)

ABSTRACT OF THE DISCLOSURE

The invention is a pneumatic tire, the three principal parts of which, namely the carcass, tread and sidewalls, are made from EPDM rubber stocks based on very tough EPDM rubber extended with 100 or more parts of hydrocarbon extending oil per 100 parts of EPDM rubber.

My invention is a fabric-reinforced pneumatic tire, the tread, sidewalls and carcass stocks of which are formed from EPDM rubber extended with at least 100 parts by weight of hydrocarbon oil per 100 parts of EPDM rubber, said EPDM rubber being of such toughness that the Mooney viscosity (ML–4 at 212° F.) of a compound of 100 parts by weight thereof and 100 parts of hydrocarbon oil is from 30 to 90.

More particularly, it is such a tire wherein the EPDM rubber is a terpolymer of ethylene, propylene and dicyclopentadiene.

Many efforts to produce EPDM pneumatic tires have been made heretofore. However, I believe that I am the first to make such a tire, the major components of which, i.e., the tread, sidewalls and carcass stocks, are made from EPDM rubber having the toughness specified above extended with the extremely high oil loading specified above. The major advantages of the tire of my invention include lower cost, softer and quieter ride, better skid resistance, improved wear resistance, improved resistance to groove cracking, freedom from checking, improved tear resistance, and improved performance at low temperatures.

There follows a detailed description of a method by which the tires of my invention can be made.

Any of the known EPDM rubbers can be used in the practice of my invention. As is well-known, the EPDM rubbers are sulfur-vulcanizable terpolymers of ethylene, propylene and a non-conjugated polyene in which the ethylene-to-propylene weight ratio usually ranges from 20:80 to 75:25 and the non-conjugated polyene usually ranges from 0.5 to 15 percent of the weight of the terpolymer. I have had outstanding success using ethylene-propylene-dicyclopentadiene terpolymers such as those sold as "Royalene." However, I can use terpolymers based on other third monomers than dicyclopentadiene, examples being 1,4-hexadiene, 1,5-cyclooctadiene, methylene norbornene, propenyl norbornene, etc. I prefer to use EPDM rubbers of the same type, i.e. based on the same third monomer, throughout the tire.

The EPDM rubber is compounded with hydrocarbon oil of the type commonly used for extending rubber, in the amount set forth above. The tougher the EPDM rubber, the higher the oil loading that can be used. Those skilled in the art will be able to adjust the oil loading to the toughness of the EPDM rubber so as to get good results.

The EPDM rubber stocks used in the several component parts of the tire are compounded in accordance with principles well known in the rat. The compounding and vulcanizing ingredients, other than the hydrocarbon extending oil, usually include carbon black, zinc oxide, stearic acid, accelerators and sulfur. The selection of the types and amounts of the compounding and vulcanizing ingredients should of course be such that vulcanizates of the complete compounds have the requisite physical properties. Thus, the tread stock vulcanizate should have a 300% modulus of at least 600 pounds per square inch and an elongation at break of at least 400%. The sidewall stock may or may not be identical with the tread stock but in either event its vulcanizate should have a 300% modulus of at least 500 pounds per square inch and an elongation at break of at least 300%. The carcass stock vulcanizate should have a 300% modulus of at least 800 pounds per square inch and an elongation at break of at least 300%.

I have achieved excellent results using the following tread and sidewall and carcass stocks:

Tread and sidewall stock

| Ingredient: | Parts by weight |
| --- | --- |
| "Royalene 400" [1] | 200 |
| ISAF carbon black | 110 |
| Stearic acid | 2 |
| ZnO | 10 |
| MBT (mercaptobenzothiazole) | 0.8 |
| "Monex" (tetramethylthiuram monosulfide) | 1.6 |
| Sulfur | 4 |

[1] A mixture of equal parts by weight of "Sunthene 2100" (a hydrocarbon extending oil) and an ethylene-propylene-dicyclopentadiene terpolymer having an iodine number of 12 and an ethylene-propylene ratio of 60–40, the mixture having a Mooney viscosity (ML–4 at 212° F.) of 60.

A vulcanizate made by curing this stock for 30 min. at 320° F. had a 300% modulus of 910 p.s.i., an elongation at break of 530%, a Shore A hardness of 52 and a tensile of 2600 p.s.i.

Carcass stock

| Ingredient: | Parts by weight |
| --- | --- |
| "Royalene 400" [1] | 100 |
| "Royalene X302" [2] | 50 |
| "Circosol 2XH" (hydrocarbon extending oil) | 50 |
| FEF carbon black | 55 |
| HAF carbon black | 55 |
| Stearic acid | 1 |
| Zinc oxide | 10 |
| MBT | 1.5 |
| "Monex" | 3.0 |
| Sulfur | 5 |

[1] A mixture of equal parts by weight of "Sunthene 2100" (a hydrocarbon extending oil) and an ethylene-propylene-dicyclopentadiene terpolymer having an iodine number of 12 and an ethylene-propylene ratio of 60–40, the mixture having a Mooney viscosity (ML–4 at 212° F.) of 60.
[2] An ethylene-propylene-dicyclopentadiene terpolymer having an iodine number of 12, an ethylene propylene ratio of 60–40 and a Mooney viscosity (ML–4 at 212° F.) of 90.

A vulcanizate made by curing this stock for 30 min. at 320° F. had a 300% modulus of 1300 p.s.i., an elongation at break of 420%, a Shore hardness of 54, and a tensile of 2200 p.s.i.

Any tire fabric can be used in making tires according to my invention. Examples are fabrics made from fibers of rayon, nylon, polyester, glass, steel and combinations thereof. The tire can be of conventional construction or it can be of non-conventional construction, an example of the latter being the so-called radial ply tire.

In preparing to build the tire, the fabric is preferably solutioned, prior to being skim-coated with the carcass stock, with a two-coat system, the two coats being as follows:

Coat 1

| | |
| --- | --- |
| "PAPI" (Polymethylene polyphenylisocyanate having an average mol. wt. of 300–400) | 80 |
| Carcass Stock [1] | 100 |
| Tetrachloroethylene to 2% solids. | |

See footnote 1 in column 3.

Coat 2

4% solution of Carcass Stock¹ in tetrachloroethylene.

The fabric is dried between coats and after the second coat for from 2 to 5 minutes at 320° F. in a forced draft oven. The dry pick-up of the first coat was 1% and the dry pick-up of the second coat was such that the total pick-up was 6–8%. This two-coat solutioning system works best with nylon and polyester fabrics. It is the subject of the copending application of Kiley, Ser. No. 546,123 filed April 13, 1966.

The foregoing compound is conventionally milled and is then given extra mastication by putting a charge of 2800 grams of the compound on an 18" x 42" cold mill and milling it thereon for a period of 30 minutes with a good rolling bank of stock in the nip of the mill.

Instead of using the foregoing two-coat system, the fabric may be solutioned with a resorcinol-formaldehyde latex containing chlorosulfonated polyethylene latex as the rubber constituent, and made by mixing the following solutions A, B and C by adding A to B and then adding C to the mixture of A and B.

| Ingredients: | Parts by weight |
|---|---|
| Solution A | |
| 20% chlorosulfonated polyethylene latex | 715 |
| Solution B | |
| 75% aqueous solution of resorcinol-formaldehyde resin | 320 |
| Concentrated (28.7%) ammonium hydroxide | 86.4 |
| Water | 2000 |
| Solution C | |
| 37% formalin | 163 |
| Water | 1928 |

The solutioning is carried out in the conventional way, the dipping being followed by drying at 320° F. The pick-up of solids is about 6%. This solutioning technique gives best results on nylon and rayon fabrics.

The solutioned fabric is skim-coated with the carcass stock by calendering in known manner.

The tread stock and the sidewall stock may be separately extruded, using conventional tubers, to cross-sections ready for building into the tire at the appropriate point. Where desired, they may have the same formulation and may be extruded to form a composite tread and sidewall cross-section. The previously extruded tread and sidewalls can be applied to the carcass body on the building drum. Alternatively, the tread or the tread and sidewalls may be applied to the tire by the spliceless method described in U.S. Patent 3,259,682 in the names of Neville et al.

In building tires according to my invention, I prefer to use a tackifying and bonding cement of the type described in copending application Ser. No. 445,699 filed Apr. 5, 1965 in the names of Eckert and English to impart building tack to the parts of EPDM rubber stock which are to be bonded. This cement is used between the plies of the carcass, on the bottom and ends of the tread and sidewalls (except where the tread or tread and sidewalls are applied by the spliceless method), etc.

¹ Carcass Stock used in Coat 1 and Coat 2

| Ingredient: | Parts by weight |
|---|---|
| "Royalene X302" | 100 |
| HAF carbon black | 50 |
| Zinc oxide | 5 |
| Stearic acid | 1 |
| MBT | 0.4 |
| "Tuex" (tetramethylthiuramdisulfide) | 1.8 |
| Oiled "Crystex" (80% sulfur, 20% oil) | 1.8 |

A preferred formulation for such a cement is as follows:

| Ingredient: | Parts by weight |
|---|---|
| "Royalene" tread and sidewall stock as described above | 200 |
| Resin A of aforementioned Eckert and English application¹ | 160 |
| Cyclohexane | 1560 |

¹ Condensate of 1.25 moles phenol, 4 moles alpha-pinene, 1 mole beta-pinene and 5 moles of dicyclopentadiene, having softening point of 94° C.

The carcass body of the tire is built in the usual manner on a building drum, beads and EPDM-coated toe strips being incorporated in the usual way. The wire in the beads is coated with an EPDM stock of suitable hardness and the bead bundles are wrapped with EPDM-coated fabric.

In making tires in accordance with my invention, I have successfully used bead bundles the wire of which was coated with the following stock:

Bead stock

| Ingredient: | Parts by weight |
|---|---|
| "Royalene X302" | 80 |
| "Hypalon Type 45" (chlorosulfonated polyethylene) | 20 |
| HAF carbon black | 50 |
| SRF carbon black | 70 |
| Zinc oxide | 20 |
| Stearic acid | 1 |
| "Circosol 2XH" | 40 |
| "BCT Resin" (a phenol-formaldehyde resin of the novolac type) | 15 |
| MBT | 1.5 |
| Oiled "Crystex" | 7.5 | and which were wrapped with fabric coated with the following stock:

Stock for coating bead wrap and toe strip fabric

| Ingredient: | Parts by weight |
|---|---|
| "Nordel 1070"¹ | 100 |
| FEF carbon black | 40 |
| "Sunpar" (hydrocarbon extending oil) | 50 |
| SRF carbon black | 80 |
| Zinc oxide | 15 |
| "Tuex" (tetramethyl thiuram disulfide) | 2 |
| Oiled "Crystex" | 2 |
| Stearic acid | 1 |

¹ An EPDM rubber made with 1,4-hexadiene as the third monomer, having a Mooney (ML–4 at 212° F.) viscosity of 74, an iodine number of 13, and an ethylene-propylene ratio of 57:43.

In making tires of my invention, I have successfully used toe strips made of a conventional monofilament nylon fabric coated with the same stock as that just described for the bead wrap fabric.

If desired, an air-retaining liner can be incorporated in my tires. I have successfully used liners made from butyl rubber stock of the type commonly used in making butyl rubber tires, since butyl rubber adheres exceedingly well to EPDM upon vulcanizing a laminate of the two stocks.

The previously extruded tread and sidewalls may be applied to the carcass body on the building drum. Alternatively, I may apply them by the spliceless technique referred to above.

I have found that special care must be taken to prevent opening of the splices during shaping if the tread or tread and sidewalls or sidewalls are applied in the conventional manner to the previously assembled carcass on the building drum, i.e., by cutting the previously extruded tread or combined tread and sidewalls or sidewalls to the proper length with the ends having a suitable angle and then wrapping these cut sections around the carcass; this is so even though a tackifying cement of the type described above and in the aforementioned Eckert and English application is used at the splices. This special care involves mechanically pressing the cemented ends of the sections together for a period of at least 2 hours, and preferably at least 12 hours, before processing the cylindrically shaped tire further by shaping and vulcanizing in the usual way. Holding the ends of the splices together in this way apparently allows the extremely high molecular weight EPDM rubber to flow together at the splice and form a bond sufficiently strong to prevent opening of the splice during the shaping step which precedes vulcanization; this shaping step expands the extruded section so as to cause difficulty by opening these splices unless this special care is taken.

The ends of the splices can be pressed together by any suitable means obvious to those skilled in the art. Thus they may be held by means of C-clamps or by placing the assembly in a suitable press designed to press together the ends of the section being spliced. Because this special care is inconvenient and slows up production and for other reasons, I much prefer to apply the tread and sidewalls by the aforementioned spliceless method.

The shaped tires are vulcanized in conventional vulcanizing equipment. I find that for best results they should be cured at a temperature and for a time equivalent to curing for at least 30 minutes at 320° F. Those skilled in the art will understand what curing conditions are equivalent to at least 30 minutes at 320° F.

In practicing my invention, the oil-loading in the EPDM stocks used in the major components (carcass, tread and sidewalls) of my tire is at least 100 parts by weight based on 100 parts of the EPDM rubber of the toughness specified above and in the appended claims. Generally speaking, this oil loading does not exceed 300 parts by weight.

Almost invariably, if not always, the sole rubbery polymer in the tread, sidewalls and carcass stocks in my tires is EPDM rubber. I prefer that the rubber stocks used in all other parts of my tires be made with EPDM as the only polymer.

EXAMPLE

Pneumatic tires of the size known as 7.50–14 were made with two plies of nylon fabric using the above-described tread and sidewall stock, carcass stock, two-coat system for solutioning the fabric, tackifying cement for imparting the required building tack to the parts being joined, bead assemblies and toe strips. Some of the tires embodied butyl rubber liners of the type conventionally used in making all-butyl tires. No liners were used in the rest of the tires. Some of the tires were built in the conventional manner while the rest of the tires were built in the conventional manner except that their treads were applied by the spliceless method referred to above. In all cases the special precautions referred to above for preventing opening of the tread and/or sidewall splices during shaping were taken. All four types of tires were tested and found to perform outstandingly.

Having thus described my invention, what I claim and desire to protect by Letters Patent is:

1. A pneumatic tire comprising a vulcanized assembly of a carcass made from plies of reinforcing tire fabric coated with carcass stock, a tread and sidewalls, each of said carcass stock and the stocks from which said tread and sidewalls are made being based on EPDM rubber extended with at least 100 parts by weight of hydrocarbon oil of the type used for extending rubber per 100 parts of EPDM rubber, the EPDM rubber on which each of said three stocks is based being of such toughness that the Mooney viscosity (ML-4 at 212° F.) of a compound of 100 parts by weight of said rubber and 100 parts of hydrocarbon oil of the type used for extending rubber is from 30 to 90.

2. A tire as set forth in claim 1 wherein the level of said hydrocarbon oil in each of said carcass, tread and sidewall stocks is from 100 to 300 parts by weight per 100 parts of EPDM rubber.

3. A tire as set forth in claim 1 wherein the EPDM rubber in each of said carcass, tread and sidewall stocks is a rubbery terpolymer of ethylene, propylene and dicyclopentadiene.

References Cited

UNITED STATES PATENTS 2,964,083  12/1960  Pfau et al. _____ 260—33.6

FOREIGN PATENTS 622,040  12/1962  Belgium.

OTHER REFERENCES

E. I. du Pont de Nemours & Co. (Inc.), "Nordel Hydrocarbon Rubber," April 1964, pp. 16 and 17.

ALLAN LIEBERMAN, *Primary Examiner.*